(12) United States Patent
Murphy

(10) Patent No.: US 11,773,829 B2
(45) Date of Patent: Oct. 3, 2023

(54) FLYWHEEL ARRANGEMENT

(71) Applicant: Heptron International Limited, St Helens (GB)

(72) Inventor: Gary Murphy, St Helens (GB)

( * ) Notice: Subject to any disclaimer, the term of this patent is extended or adjusted under 35 U.S.C. 154(b) by 0 days.

(21) Appl. No.: 17/293,107

(22) PCT Filed: Nov. 11, 2019

(86) PCT No.: PCT/GB2019/053192
§ 371 (c)(1),
(2) Date: May 12, 2021

(87) PCT Pub. No.: WO2020/099849
PCT Pub. Date: May 22, 2020

(65) Prior Publication Data
US 2022/0003220 A1 Jan. 6, 2022

(30) Foreign Application Priority Data
Nov. 12, 2018 (GB) ..................... 1818393

(51) Int. Cl.
*F03G 3/08* (2006.01)
*F16C 32/04* (2006.01)
*H02K 7/02* (2006.01)
*F16F 15/31* (2006.01)
*F16F 15/315* (2006.01)

(52) U.S. Cl.
CPC ............ *F03G 3/08* (2013.01); *F16C 32/0408* (2013.01); *F16F 15/31* (2013.01); *F16F 15/3156* (2013.01); *H02K 7/025* (2013.01); *F16C 2361/55* (2013.01); *F16F 2230/24* (2013.01)

(58) Field of Classification Search
CPC ........................ F16F 15/3156; F16F 2230/24; F16C 32/0408
See application file for complete search history.

(56) References Cited

U.S. PATENT DOCUMENTS

| 5,247,853 A | 9/1993 | Dalebout |
| 2008/0083298 A1 | 4/2008 | Lin |
| 2009/0033162 A1 | 2/2009 | Dugas |

FOREIGN PATENT DOCUMENTS

| CN | 202435186 U | * | 9/2012 | |
| DE | 102011117645 A1 | * | 5/2013 | ............... F03G 3/00 |
| DE | 102011117645 A1 | | 5/2013 | |
| EP | 3343065 A1 | * | 7/2018 | |
| GB | 2463534 A | | 3/2010 | |
| JP | S61149646 S | | 7/1986 | |

OTHER PUBLICATIONS

International Search Report and Written Opinion of the International Searching Authority for corresponding International Patent Application No. PCT/GB2019/053192, dated Mar. 23, 2020.

* cited by examiner

*Primary Examiner* — Vicky A Johnson
(74) *Attorney, Agent, or Firm* — Renner, Otto, Boisselle & Sklar, LLP

(57) ABSTRACT

A flywheel arrangement comprising a shaft with a flywheel fixedly connected thereto. The flywheel comprises at least one cavity and that cavity is at least partially filled with particulate matter.

20 Claims, 8 Drawing Sheets

FLYWHEEL ARRANGEMENT

This application is a national phase of International Application No. PCT/GB2019/053192, filed on Nov. 11, 2019, which claims priority to GB Application No. 1818393.9, filed on Nov. 12, 2018, the entire disclosures of which are hereby incorporated by reference.

Presently many efforts are being made to convert and store energy so that electricity can be made available at a time and a place when and where it is required.

One method of energy storage presently being developed is a flywheel storage system comprising a flywheel that uses fluid to make up a proportion of its mass. A problem with this type of flywheel is that, during the operating cycle, the fluid may evaporate and thereby change the weight of the flywheel. Another problem with this type of flywheel is that, if there is a need for a flywheel containing fluid and the need is situated in a warm climate, fluid may not always be readily available or if fluid is available it may evaporate. Therefore, there exists a need for a flywheel that is safe to use and is efficient to operate and can be constructed from readily available materials.

In a flywheel energy storage system, the amount of kinetic energy that can be stored within a rotating flywheel depends upon several factors but the two main factors that govern the amount of energy that can be stored are firstly the rotational speed of the flywheel and secondly the mass of the flywheel.

A flywheel energy storage system may have its operating cycle broken down into three distinct operating periods of time. There is firstly the period of time when energy is transferred from one form of energy such as for example electrical energy into the flywheel to be stored as kinetic energy which can then be seen as the rotation of the flywheel. Then there is the period of time when energy is not being transferred into the flywheel and not being transferred out of the flywheel other than losses within the system. Lastly there is the period of time when energy is being transferred out of the flywheel; this is usually converted into electrical energy for use by the consumer. During these three periods of the operating cycle different forces, stresses and strains may be set up within a flywheel energy storage system. These forces, stresses and strains may be transferred to and from the supporting bearings. These forces, stresses and strains may reduce the operating life of the flywheel energy storage system. There may also be different amounts of particulates or particulates and fluids within a partially hollow flywheel at different times during the operating cycle, this means that there will be different stresses and strains upon the supporting bearings at different times of the operating cycle. Furthermore, if particulates or particulates and fluids are not evenly distributed throughout a partially hollow flywheel then the flywheel may be unevenly balanced which may result in excessive vibrations which in turn may result in the destruction of a partially hollow flywheel. Therefore, to coordinate the even distribution of particulates, there also exists a need for a computer-controlled distribution system that may be used to deliver particulates or particulates and fluids to a pre-calculated position within a partially hollow flywheel.

STATEMENTS OF INVENTION

The present invention is directed to a flywheel arrangement comprising a shaft with a flywheel connected thereto, wherein the flywheel comprises at least one cavity, wherein the cavity is at least partially filled with particulate matter.

Therefore, there is provided a flywheel energy storage system that is safe to operate, and has at least a proportion of its mass comprised of particulate material or a combination of particulate material and fluid. In one arrangement, it may be desirable to change the mass of the flywheel by providing an inlet to the flywheel, wherein the inlet is connected to a source of particulate; however, it is preferable that the, at least one, or each, cavity is provided with particulate. Thus, the mass of the flywheel may be varied by adjusting the quantity of the particulates within the flywheel cavity, but at least some of the flywheel is pre-filled with particulate that is not removeable therefrom.

Thus, the present invention may provide for a flywheel arrangement having a flywheel connected to a central shaft and a support mechanism therefor, wherein the flywheel comprises at least one cavity that is provided with, or pre-filled with, particulate therein. At least some of the particulate may be fixed in position or retained in a closed section of the cavity to prevent it moving from the cavity. Additionally, or alternatively, the cavity may have a larger volume than that taken up by the particulate to allow movement of the particulate within the cavity, thereby allowing its mass to be moved during operation of the flywheel. Therefore, at least some of the particulate may be held within a cavity and prevented from moving therefrom, or it may be able to pass between cavities, but not leave the flywheel. This particulate material may be pre-packed into the flywheel or flywheel sections before construction of the flywheel or the flywheel may be constructed and then particulate inserted before operation or installation of the flywheel. The flywheel sections may be aligned in rows and columns around the central shaft so that there are two-dimensions, thereby forming an array of connected flywheel sections.

The flywheel arrangement may be orientated to have an axis of rotation that is substantially vertical or substantially horizontal and the central shaft may be supported by magnetic bearings.

It is advantageous that at least one baffle extends substantially radially with respect to the shaft and/or at least one baffle extends substantially parallel with the axis of the shaft. The provision of baffles aids with the balance and stability of the flywheel when particulates are provided there because the baffles assist with controlling the distribution, placement and positioning of particulates within the cavity of the flywheel. Whilst one cavity may be used in the present invention, it is preferable that a plurality of cavities is employed in the flywheel.

Additional particulate may be arranged in a reservoir or container and the particulate can travel from the reservoir into the cavity of the flywheel. In one arrangement, the particulate may be returned to the reservoir from the flywheel, which may occur during the third phase of the operating cycle or at any appropriate time, such as after the flywheel is no longer rotating. In one arrangement, the reservoir is part of the flywheel and the particulate moves from a location close to the axis of rotation to a position distal therefrom.

The movement or flow of the particulate material may be by way of one or more computer controlled adjustable valves, inlets and/or outlets, which may be used to safely control the flow of a quantity of particulates from adjacent flywheel sections or a reservoir into cavities within the confines of a partially hollow flywheel.

Preferably, the at least one baffle is provided with a fluid outlet arranged in fluid communication with the cavity and, more preferably, a fluid conduit may be provided within the baffle and the fluid outlet comprises at least one aperture passing through the baffle to allow fluid from within the fluid conduit to pass into the cavity of the flywheel. The fluid conduit may be provided within, or adjacent, the shaft and that fluid conduit is in fluid communication with the fluid outlet. To allow the particulate to flow more freely, it may be desirable to provide a fluidising means to enable particulates within the present invention to move with more freedom. This may be in the form of fluid, particularly gas, flowing through the particulate to fluidize it.

The energy storage system of the present invention may allow the particulates to be combined with fluids or gases, such as compressed air, in order to fluidize the particulates, thereby aiding with the distribution and/or transfer of particulates within the cavity of the flywheel. The conduits, which may be tubes, ducts and/or passageways may be used to allow a fluid such as compressed air to travel from a compressor through the conduits to the lower level of the amassed particulates within the cavity. Therefore, a fluid, such as compressed air or gas, may be directed through tubes or ducts to then flow through the particulate material, thereby fluidising the particulates so that they may move more freely and distribute the quantity more evenly within the cavity and more evenly within the flywheel. It is preferable that particulates are able to move and circulate within the cavity of the flywheel aided by the movement of the fluid.

Preferably, a particulate conduit is provided in or adjacent the shaft to allow the passage of particulate matter from a reservoir within the flywheel into the cavity of the flywheel or between adjacent sections. Thus, the shaft of the flywheel may be used to transfer particulates in to the cavity of the flywheel, and the centre shaft may incorporate apertures, ducts and/or passageways as well as inlets and outlets thereto and therefrom that can be used to transfer and direct particulates. The apertures, ducts and/or passageways may be provided adjacent the shaft, for example, running along the external surface thereof, or they may be provided within the shaft in the form of a conduit therethrough.

There may be a plurality of particulate conduits through, or on, the shaft and the particulate may be directed and transferred into the required particulate conduit by way of alignment nozzles, which may be used to precisely direct particulates into the correct particulate conduit that will then direct the particulate to a specific position or location within the flywheel. As the flywheel is intended to be used in a vertical alignment, that is, the shaft is substantially vertical, in use, the particulate may employ gravity to move it through the conduit(s). The flow of particulate through the conduits may be assisted by the use of fluid, for example, liquid or compressed air/gas. Where one or more nozzles are employed, there may a support means for holding the nozzle(s) in place In one arrangement, a sensor is provided within the cavity to monitor the particular matter therein. The sensors may be employed to provide feedback signals to a computer control system so that the computer control system can be used to determine where particulates are positioned within the cavity at any time when the flywheel is either rotating or stationary. The cavity may be provided with a plurality of sensors and/or, where there are a plurality of cavities or sections of cavities, a sensor may be provided in each section or cavity to monitor the particulate therein and to feedback to a computer control system. The information can be used to determine whether a change in the distribution of the particulate is required.

It is advantageous that the cavity is provided with an outlet to allow the particulate to be removed from the cavity of the flywheel. The outlet may be shaped or angled to direct the particulate back to a reservoir or container so that it can be reused.

In a preferred arrangement, the flywheel has flanges comprising a magnetic element and support means are provided for magnetically stabilising the flywheel. The use of magnetic bearings allows the flywheel to be levitated, thereby reducing friction and increasing the efficiency of the system. Additionally, the bearings can be used to assist with stabilising the flywheel. A bearing may be situated at the top and/or bottom of the flywheel to keep the central shaft in place to allow it to rotate. An adjustable magnetic support may be provided which may be adjusted to apply a force in an upward direction which may reduce pressure placed on other bearings attached to the flywheel of the present invention.

In order to maintain the balance of the flywheel of the present invention, it is necessary to evenly distribute a quantity of particles within a partially hollow flywheel, therefore to aid with the even distribution of particulates within the flywheel of the present invention, a vibration means is provided which may be used to vibrate the flywheel. Therefore, the flywheel arrangement may also comprise a computer-controlled vibration mechanism and/or a fluidizing channels to aid with the even distribution of particulates within a flywheel.

The flywheel arrangement may incorporate one or more prefabricated sections that may be constructed from composite materials and may be pre-packed with a quantity of particulates. The prefabricated sections may be bonded together to form an outer wall of a flywheel. In one arrangement, the outer wall of the flywheel may be constructed from one or more prefabricated sections which are pre-packed with a quantity of particulates before the said prefabricated sections are connected together to form the outer wall of the flywheel. The pre-packed particles may be bonded together or may be unbonded. The sections of the flywheel may be partitioned by shelves of baffles that may be provided with apertures to allow the passage of particulate material therethrough. The flywheel and particulate material may comprise readily available materials, for example, the particulate may comprise sand, which may be readily available in hot climates. The use of prefabricated sections allows for easy transportation and assembly of a flywheel for use in the present invention.

To aid with the balance of the flywheel, there may be a combination of pre-packed and confined particulates and additional particulates or fluids which may be transferred into the flywheel during the operating cycle. In one arrangement, a proportion of the mass of the flywheel may comprise particulates that are retained in, or on, the flywheel and that do not leave the flywheel, for example to travel to or from a reservoir. It might be that the particulate is displaced during the operating cycle within a pre-determined volume.

The present invention may allow one to control and adjust the positioning of a proportion of the mass of a partially hollow flywheel by adjusting the location and/or the quantity of particulates therein and wherein the balance of a flywheel may be maintained and improved by the positioning and/or re-positioning of particles within the flywheel.

The particulate material may comprise sand, plastics material, metallic particles, salt or any other granulated particles.

The present invention may include a computer-controlled distribution system for the controlled movement of particulates or both particulates and fluids within the confines of a partially hollow flywheel energy storage system containing particulates or both particulates and fluids. Furthermore, the system may be used to aid with the balance, vibration and overall performance of a partially hollow flywheel containing particulates or both particulates and fluids. The computer control system may calculate where and when to direct the delivery of a quantity of particulates or a combination of both particulates and fluids within the cavity of the flywheel in order to maintain an even distribution of the mass and thereby reduce the risk of imbalance of the flywheel. The movement of particulate may be put into effect by the use of valves, conduits, doors, flaps and other mechanisms within the flywheel.

It may be that the flywheel is connected, preferably fixedly connected, to the centre shaft so that the flywheel and shaft rotate together. The flywheel may also be connected by a support, such as cables, wires, plates, baffles or other connecting means. The support may extend from a position at, or adjacent to, the periphery of the flywheel to the shaft.

The shaft of the flywheel arrangement may be supported by a pin and recess arrangement with the pin being in either the shaft or a supporting section and the recess being on the other of the shaft or supporting section. Thus, the pin may be provided on the shaft or the recess may be provided on the shaft and the corresponding element. When the flywheel of the present invention is levitating on magnetic fields a centralising pin may be situated at the top and or bottom of the flywheel to aid in the horizontal and vertical positioning of the flywheel. When the flywheel of the present invention is levitating on magnetic fields a centralising pin may be situated at the top and or bottom of the flywheel to aid in maintaining the flywheels position about a fixed central axis of rotation. An electrical signal may pass through the pin and recess arrangement to monitor the location of the flywheel with respect to the support and any magnetic bearings that are employed. When the signal is detected or lost, a stepper motor may adjust the location of the flywheel to adjust its position.

An adjustable magnetic support mechanism may be provided, which may be situated at the top of a flywheel. The magnetic support mechanism may be adjusted by computer control means to a position wherein, when combined with the magnetic fields within the composite walls of the flywheel interact with the support mechanism, the flywheel may levitate. The adjustable magnetic support mechanism may be situated concentrically about the axis of rotation. The adjustable magnetic support mechanism may incorporate a connection means which may be used to aid in the transfer of fluid or gas to the centre shaft.

The flywheel of the flywheel arrangement may be constructed at least partially from composite materials, and the composite materials may incorporate magnetic materials. For example, the outer walls of the flywheel, or parts adjacent thereto, may comprise magnetic composite materials. Such magnetic regions allow the flywheel to levitate heavier masses when using magnetic supports or bearings. As the radial distance from the central axis of rotation of the flywheel increases, so too does the distance around the perimeter of the flywheel outer wall also increases. As such, the greater the circumference or perimeter of the flywheel, the greater the area that is available on which to position magnetic elements and the greater the area covered by magnetic elements, the greater then mass that can be supported using magnetic supports and/or bearings. To that end, a vertical array of magnet fields may be situated within the outer wall of a partially hollow flywheel with an array of corresponding supports or bearings being provided in the flywheel arrangement in order to magnetically support the flywheel.

In order to control the flow of particulate and/or fluid through the flywheel and flywheel arrangement, there may be provided a system of valves, such as solenoid valves, shutters and/or pistons that may be controlled by a computer control system for coordinated operation. Some or all of the conduits may be provided with such control systems. It may be that the system can be used to provide small, individual blasts of a fluid, such as compressed air to assist in the flow of particulates from one or more nozzles to one or more cavities within the flywheel or flywheel arrangement.

During operation of the it is conceivable that the particulates may be unevenly distributed, which could lead to an imbalance of the flywheel, thereby resulting in excessive vibrations. To that end, the flywheel arrangement may include a vibration mechanism and/or a fluidisation mechanism that may be used to vibrate or shake the flywheel, either during rotation or when stationary.

Sensors may be positioned within the walls of the flywheel or elsewhere in the arrangement, such as the cavities and/or shaft, to monitor the forces exerted within the system. As such, a computer control system may be employed to receive input signals from sensors and the computer control system may process the input signals and then provide output signals to operate and coordinate a number of adjustable control devices that may be used to control the rotational speed of the flywheel and/or vibration mechanism. Additionally, or alternatively, the computer control system may control the flow of particulates into and out of the cavity of the flywheel, or the flywheel itself, and it may control the flow of fluid or gas through the conduits that may aid with the fluidisation the particulates.

The flywheel may be provided with vibration means to vibrate the flywheel, and that vibration means may comprise a computer-controlled vibration mechanism and/or a fluidising channels to aid with the even distribution of particulate within a flywheel. The use of fluidizing channels and/or a mechanism for vibrating the particulate allow for the particulate to become flowable within the cavity. This assists with ensuring that the flywheel is balanced and that the particulate can be distributed appropriately within the cavity, thereby reducing the risk of damage to the flywheel arrangement and also improving the rotation of the flywheel.

The present invention incorporates a flywheel section comprising a cavity that is at least partially filled with particulate. Preferably, the flywheel section comprises at least one side wall, and external face and an internal cavity, wherein the at least one side wall is provided with a part of a connection mechanism for connection to a second flywheel section. This allows for sections of a flywheel to be at least partially pre-filled with particulate and then connected together to form the flywheel of the flywheel arrangement set out herein. The connection mechanism may be in the form of a flat surface to allow the adjacent flywheel sections to be bonded together, or it may be in the form of a hook-and-eye or recess/slot and protrusion to mechanically connect the flywheel sections together. Such an arrangement allows for the flywheel sections to be pre-fabricated and then transported to a location for assembly.

The flywheel arrangement may be positioned within a containment vessel. One purpose of the containment vessel is to provide an environment that can have a reduced atmospheric pressure, by using a vacuum pump to decrease the pressure within the containment vessel. Whilst there may be situations where energy storage is only required for a very short period, in which the flywheel arrangement may be constructed without a containment vessel or at atmospheric pressure, it is preferred that a containment vessel is provided, particularly as the containment vessel may be used to confine debris and particulates in the event of a structural failure of the flywheel or flywheel arrangement.

To that end, herein disclosed is a destructive containment vessel comprising an outer wall from which extend inwardly protruding destructive nodes, or teeth. The use of a destructive containment vessel allows the arrangement to be destroyed in the event of failure and for the energy to be dispersed more quickly and readily through the break-up of the flywheel. The nodes may have a hardness greater than that of the material from which the flywheel is constructed so that should the flywheel become unstable and the system fail, the flywheel is torn apart by the nodes of the containment vessel, which rapidly disperses the kinetic energy in a more contained manner.

Preferably, the end of the node distal from the wall of the containment vessel has a transverse cross-section that is less than that of the end of the node proximal to the wall of the containment vessel to which it is attached. Using tapered, chamfered and/or a decreasing cross-section for the node allows it to more readily penetrate the flywheel.

BRIEF DESCRIPTION OF THE DRAWINGS

Embodiments of the present invention will now be described to show more clearly how it may be put into effect with reference to the accompanying drawings in which:

FIGS. 1 to 8 show a flywheel 3 that is housed within a containment vessel 1. The flywheel 3 has outer wall 5 and a cavity 17 is arranged between the outer wall 5 and a central axis of rotation 4 of the flywheel 3. The flywheel 3 is fixed to a central shaft 13 so that rotation of the central shaft 13 rotates the flywheel 3.

Figure 1:
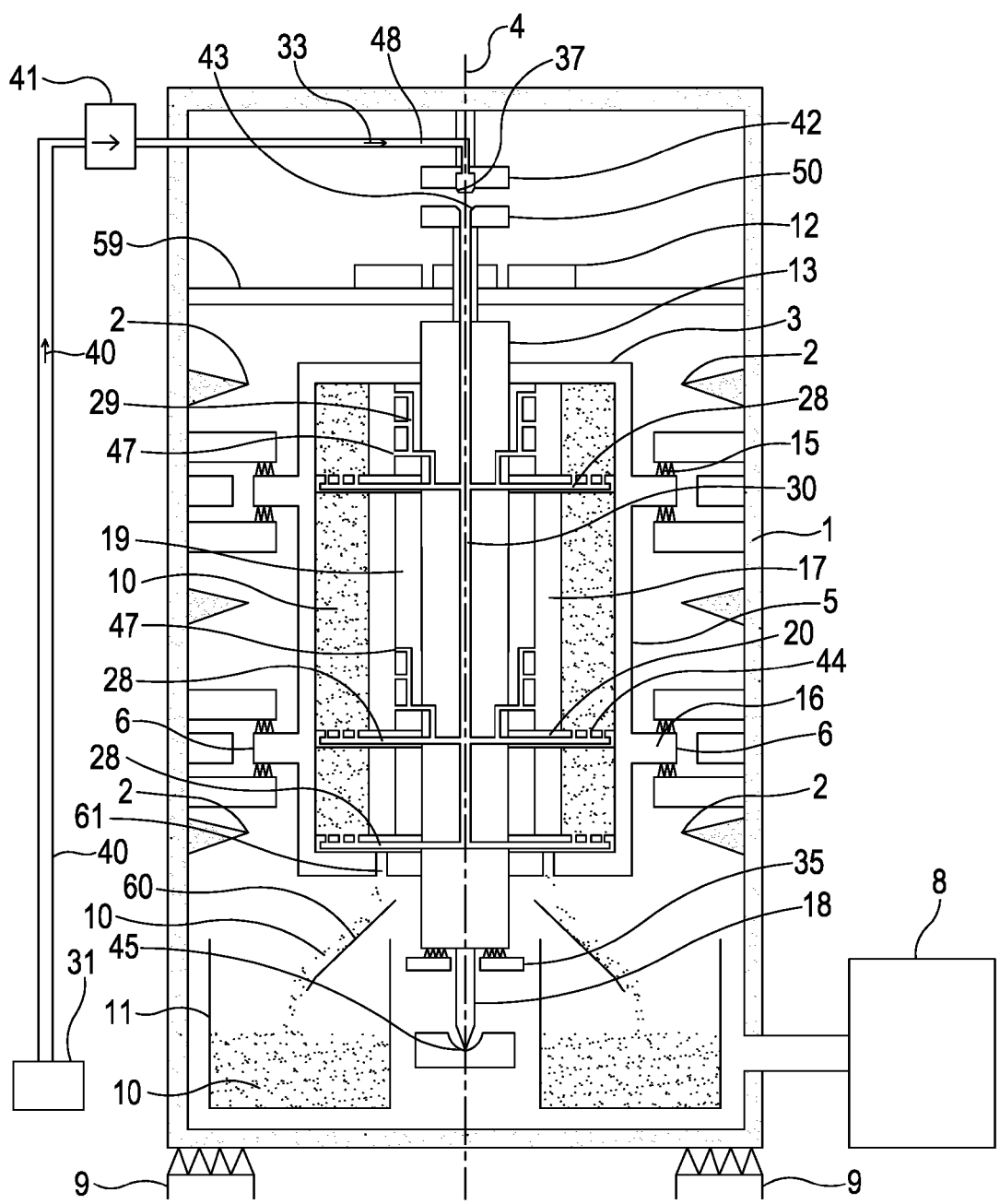
FIG. 1 shows an arrangement in accordance with the present invention.
Figure 2:
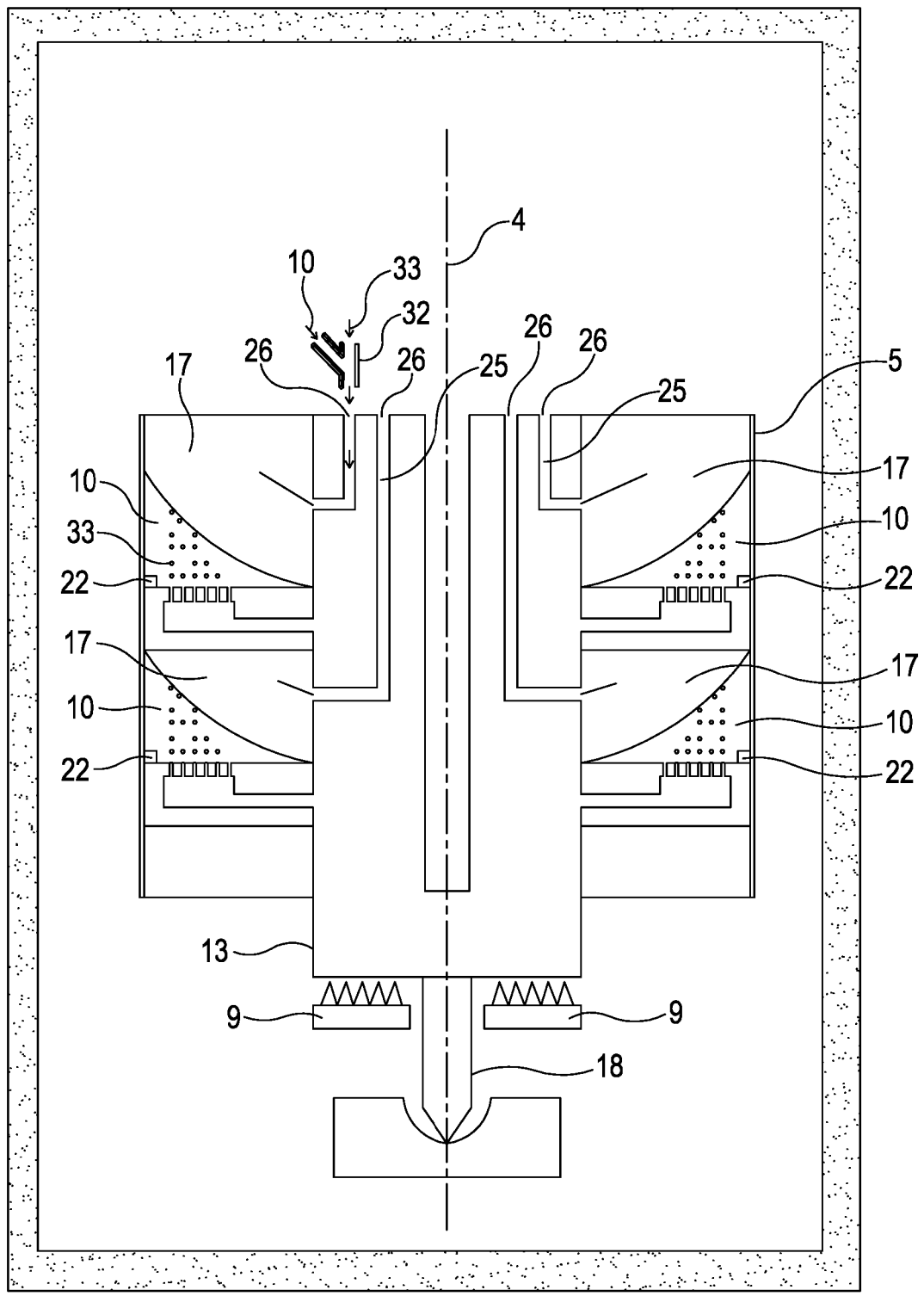
FIG. 2 shows a more detailed view of a centre shaft and flywheel in accordance with the present invention.
Figure 3:
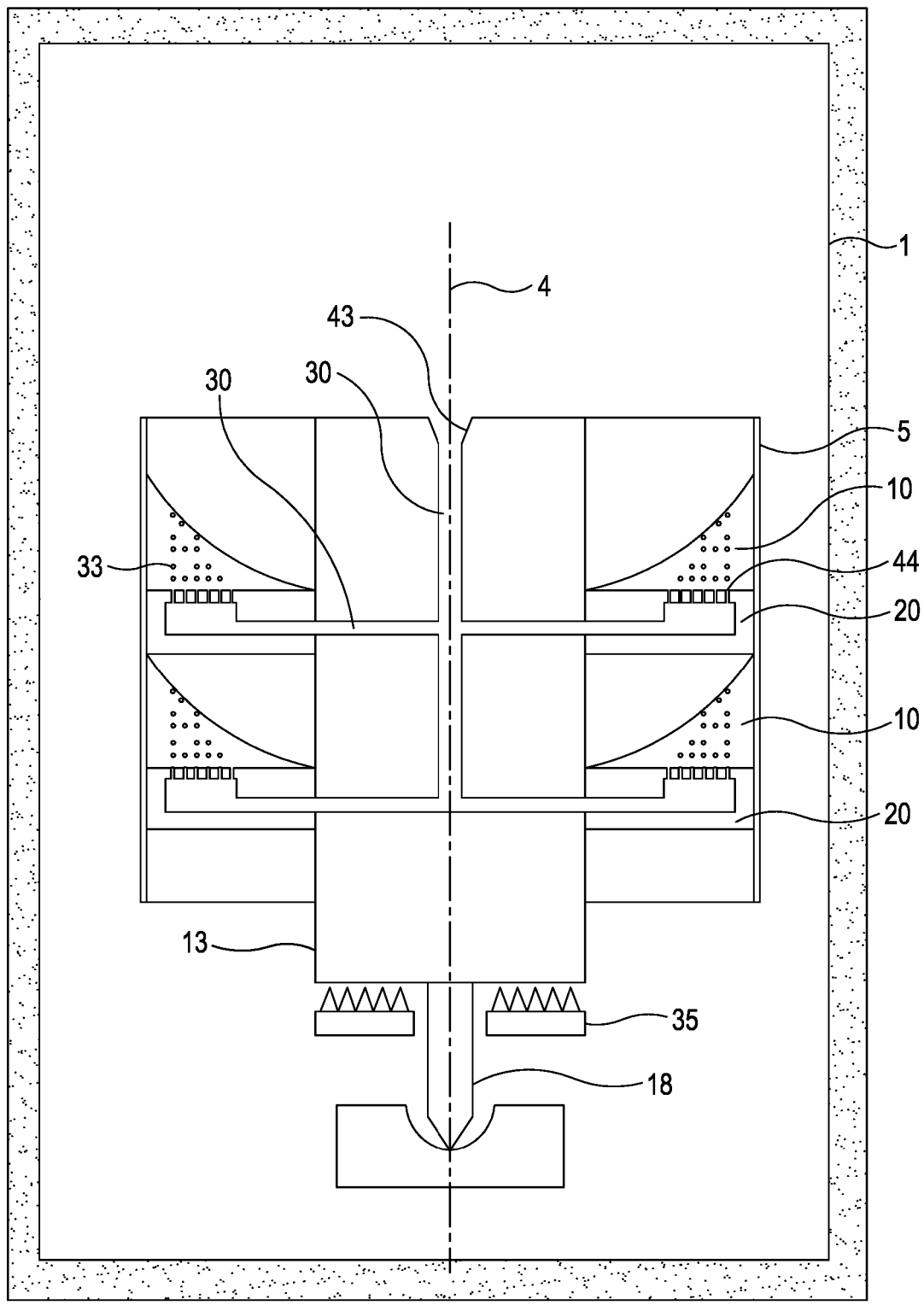
FIG. 3 shows a fluid conduit arrangement in accordance with the present invention.
Figure 4:
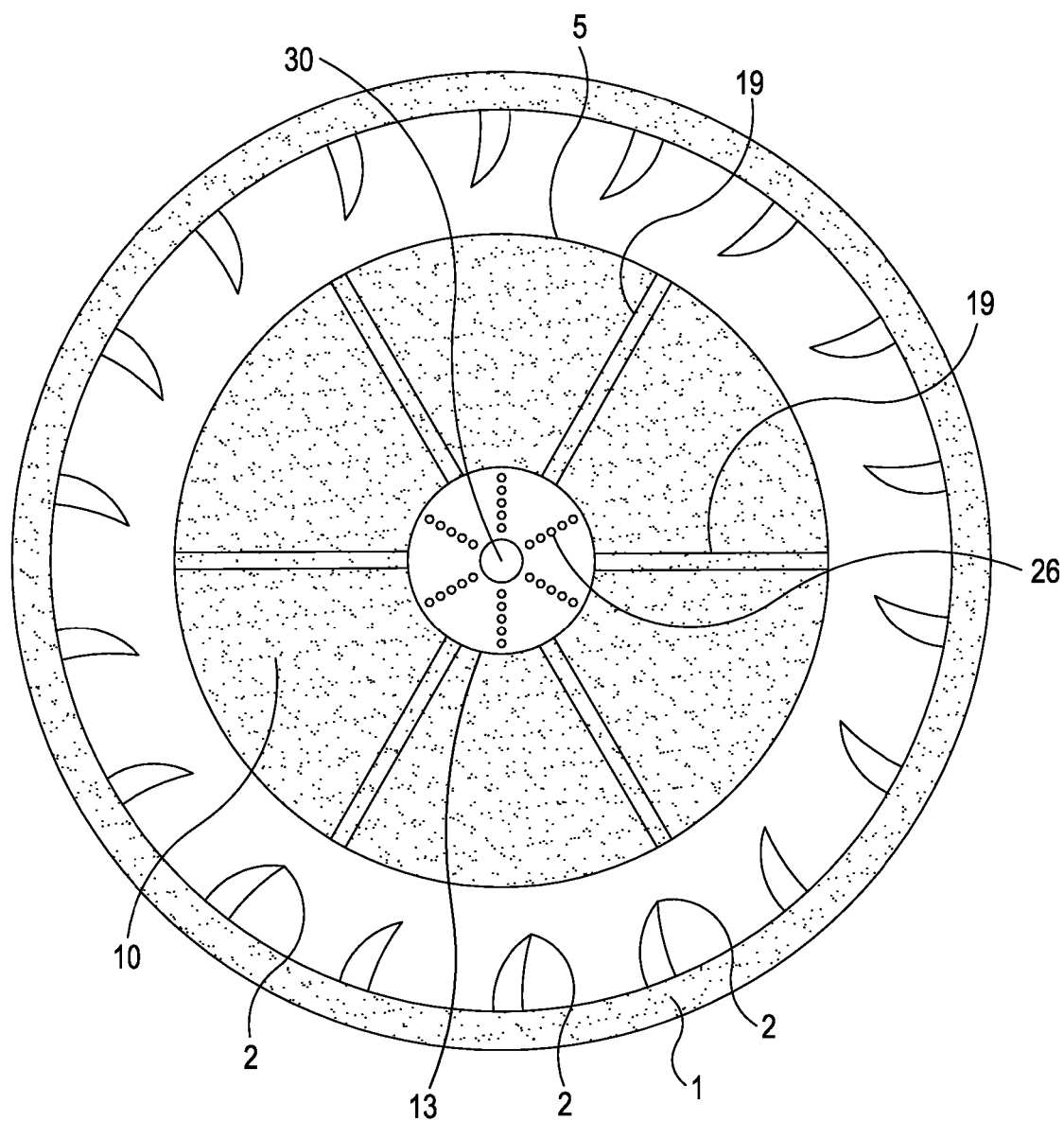
FIG. 4 shows a containment vessel housing a flywheel in accordance with the present invention.
Figure 5:
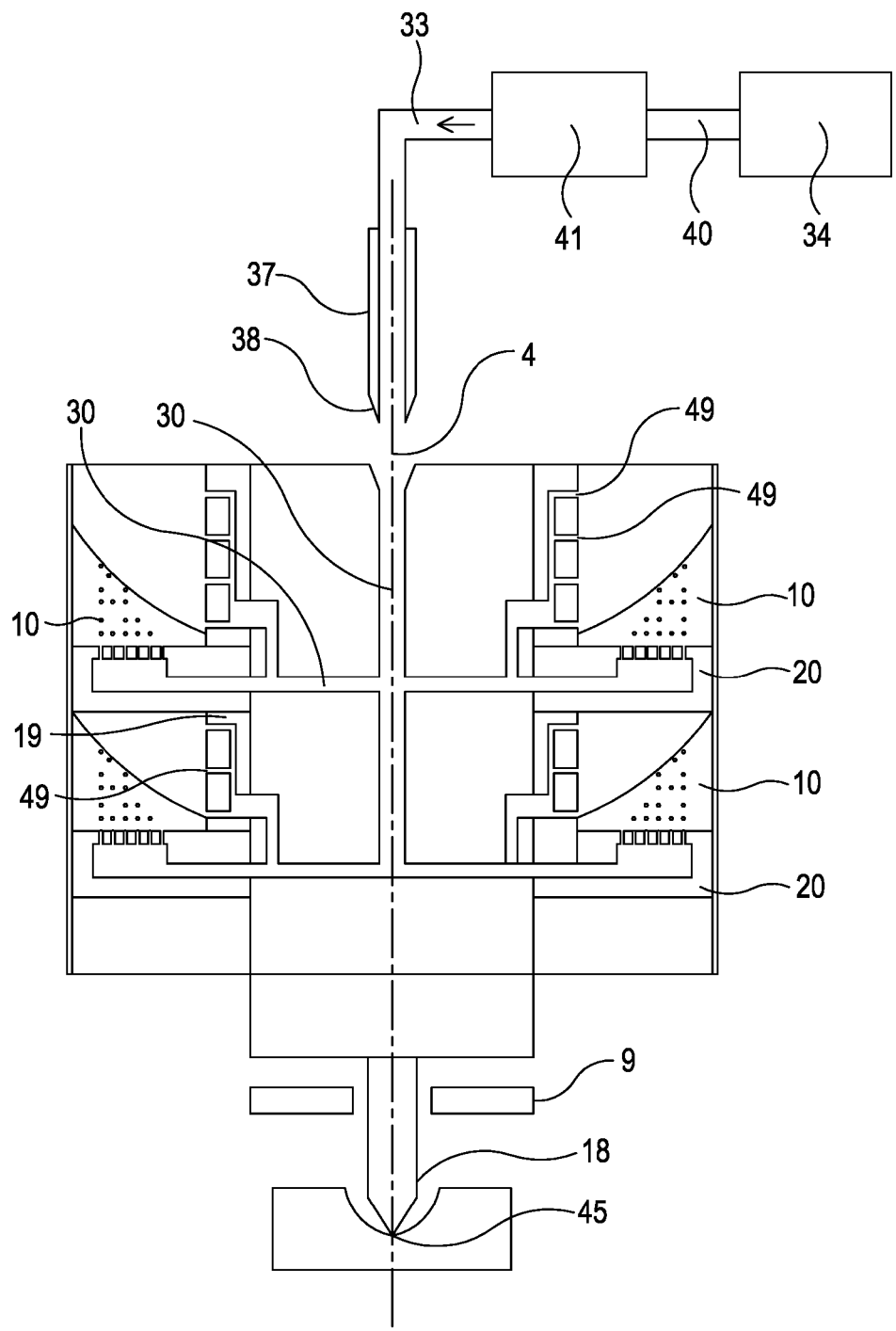
FIG. 5 shows a further fluid conduit arrangement in accordance with the present invention.
Figure 6:
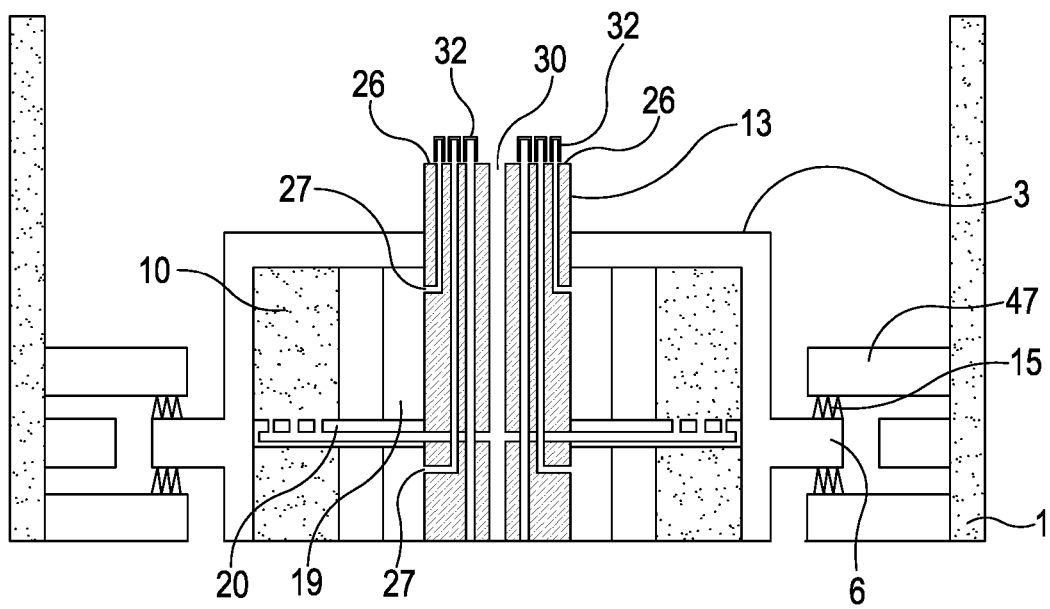
FIG. 6 shows a magnetic composite flywheel and magnetic bearings in accordance with the present invention.

The flywheel 3 is provided with vertical baffles 19 and horizontal baffles 20, the former extending substantially parallel with the central shaft 13 and the later extending radially therefrom. The central shaft 13 has a plurality of passageways or particulate conduits 25 therein that allow the passage of particulate therethrough. The inlets 26 to the passageways are provided with Y-shaped injection nozzles 32 that allow the entry of particulate 10 and compressed air 33. The particulate 10 passes through the nozzles 32, into the passageways 25 and exits the passageways 25 through outlets 27 that lead into the cavity 17 of the flywheel 3.

The centre shaft 13 is further provided with a plurality of fluid passageways, or fluid conduits, 30 that extend through the centre shaft 13 and pass into the vertical baffles 19 and the horizontal baffles 20 and exit therefrom at vertical baffle outlets 49 and horizontal baffle outlets 44. A compressor 34 is connected to a connection tube 40 that provides compressed gas 33 through adjustable air connection 37 and seal 38. The lower end of the central shaft 13 is provided with a pin 18 that sits in a centralising recess 45.

The central shaft 13 of the flywheel 3, may be supported by magnetic bearings 12, at the top and bottom of the centre shaft 13. The magnetic bearings 12, supporting the flywheel 3, may be used to stabilise the flywheel 3, from movement in a horizontal direction and in the vertical direction. For greater support of the flywheel 3, the flywheel 3 has flanges 16 that are constructed from magnetic composite materials 6, which extend into a recess of a magnetic stabilisation element on the internal wall of the containment vessel 1. The magnetic interaction between the stabilisation elements and the flanges 16 of the flywheel 3 aid in the support of greater masses more than one magnetic field 15 in the vertical direction.

Sensors 22 are provided within the cavities 17 to monitor the mass of particulate therein and the forces within the cavity 17. The information is fed back to computer control system 24 that then controls the rotational speed and the flow of particulate material to balance the flywheel. Additional, or alternative, sensors may be used, for example, accelerometer to monitor the rotation and balance of the flywheel. The sensors, such as the accelerometer and sensors 22, may be connected to the computer control means 24 by electrical wires or wirelessly, for example short-range wireless transmitters. The computer control system 24, may use the signal from the sensors and signals from the centralising pin recess 45 to determine where within the flywheel 3, would be the most appropriate position to deposit particulates 10, to maintain or improve the balance of the rotating flywheel 3.

Particulates 10 may enter the centre shaft 13 through inlets 26 from one or more nozzles 32 aided by gravity. The particulates 10 then may fall from nozzles 32 into the centre shaft inlets 26 where they continue to travel through the passageways 25, again, aided by gravity and centrifugal forces. The particulates 10 then exit the centre shaft 13, through the outlets 27, where centrifugal forces maintain the movement of the particulates 10, until the particulates 10 come to rest in the cavities 17 near to the flywheel outer wall 5.

Alternatively, or additionally, particulates 10 may enter the centre shaft 13 through inlets 26 from one or more nozzles 32 aided by a compressed fluid 33. The particulates and the compressed fluid 33 are combined within the Y-shaped nozzle 32, so that the particulates 10 enter the centre shaft 13 with enough force to enable the particulates 10 to travel through the centre shaft 13 and exit the outlets 27, continuing to traveling until the particulates 10 come to rest within the cavities 17 adjacent the flywheel outer wall 5. It is possible for the particulates 10 and compressed gas 33 to be combined remotely before they reach the nozzle 32.

The containment vessel 1 has incorporates one or more inwardly directed destructive nodes 2. The containment vessel 1 is employed not only to contain the flywheel 3 under normal operating conditions, but also in the event of a structural failure of the flywheel 3. Thus, the containment vessel 1, can be used to assist in the destruction of the rotating flywheel 3 and to confine the same within the containment vessel 1. Should structural failure of the flywheel 3 occur, all of the components used in the construction of thereof are contained within the containment vessel 1. In the event of a failure of the flywheel 3 during which the flywheel 3 becomes detached from the central shaft 13, it may be necessary to release the accumulated energy into a harmless form as quickly as possible. Therefore, the nodes 2 of the containment are provided to allow the detached flywheel 3 to smash against, which are constructed from materials, such as steel, that are tougher than the composite materials of the flywheel 3. The destructive nodes 2, may contain spikes 7 to assist with breaking-up the flywheel 3 to dissipate the kinetic energy. The nodes 2, are constructed in such a way as to force the mass of the flywheel 3, to be concentrated on a very small destructive node 2, thereby applying great destructive forces to the composite material 6. In this way the destruction of the flywheel 3, and the dispersal of the accumulated energy may be safely contained within the containment vessel 1.

The containment vessel 1, may be attached to a vacuum pump 8, which may be used to evacuate some or most, possibly all, of the air from within the vessel 1, thereby reducing the internal pressure and thus reducing the losses of energy caused by turbulence of a rotating flywheel 3. Additionally, or alternatively, the containment vessel 1, may be attached to a vibration means 9, with the vibration means 9, being able to shake the containment vessel 1, which in turn shakes the flywheel 3 containing particulates 10. The controlled vibration may be used to aid in the even distribution of particulates 10, within the cavity 17 of the flywheel 3. A vibration means 39, may additionally or alternatively be attached to the flywheel 3. The timing of the operation of the vibration means 9 and/or the vibration means 35, is determined by computer control means 24 after processing signals received from feedback sensors 22 and/or sensors 23, and other sensors within the flywheel of the present invention.

Vibration means 35 is arranged close to the flywheel 3 and the vibration means 35 is an electromagnetic device controlled by computer control means 24. When an electrical current is provided to the electromagnetic device 35, a magnetic field may be created to attract or repel a magnetic component 46 that is physically attached to the structure of the flywheel 3. The computer control means 24 can be used to change the value of the electrical power supplied to the vibration means 35, to increase or decrease the strength of the magnetic field and thereby lift and release the flywheel 3, causing the flywheel 3 and the particulates 10 to vibrate, thereby aiding with the even distribution of particulates 10 within the flywheel 3. The vibration means may be a pneumatic or hydraulic piston.

A reservoir 11 is situated within the containment vessel 1 that is used to hold a supply of particulates 10. The particulate may be transferred from the reservoir 11 by way of conveyors and/or pumps.

A compressor 34 is provided to supply compressed gas 33 and compressed gas travels through the connecting tubes 40 to the gas control valve 41. The control valve 41 is turned on or off at the appropriate time by electrical signals from the computer control means 24. The appropriate time is determined by the computer control means 24, after processing electrical signals received from sensors means 22, and accelerometer means 23, which are positioned throughout the flywheel 3. The fluid or compressed gas 33 may be transferred from the compressor 34 through passageways 30 within the centre shaft 13 and passageways 28, within the horizontal baffles 20, and passageways 29, within the vertical baffles 19. The compressed gas 33 then travels through the flywheel 3 to the bottom of the amassed particulates 10 and passes through the particulates 10, thereby fluidizing the particulates 10 increasing their ability to flow. The action of flowing air or gas through the particulates 10 provides an increased fluidity and movement within the particulates 10. Thus, when the particulates 10 are relatively free to move and the centre shaft 13 is rotating, the centrifugal forces assist with the movement of the particulates 10 towards the outer wall 5 of the flywheel 3. The particulate becomes fluidised to aid with the movement of the particulates 10 within the flywheel 3.

Once compressed air or gas has been transferred into the centre shaft 13, the adjustable air or gas connection means 37, may be disconnected to let the flywheel 3, rotate unhindered. The adjustable air or gas connection means 37, may be fitted with a seal 38, to prevent a loss in pressure of the compressed air or gas.

The computer control means 24, may be used to coordinated the control of the combination of the compressed air or gas 33, traveling through the particulates 10, at the same time as the vibration of the flywheel 3, and the centrifugal forces of the particulates 10, rotating about a central axis of rotation 4, provide a situation where the particulates 10, within the flywheel 3, may be evenly distributed throughout all of the cavities 17, of a partially hollow flywheel 3, of the present invention.

The flywheel 3 is provided with a lower aperture 61 that can be closed to keep the particulate material within the cavity or opened to allow the particulate material to flow out of the flywheel, which may be particularly important when the flywheel is slowing down. Similarly, the horizontal baffles 20 may be provided with hatches or apertures to allow movement of the particulate material through to a lower level, eventually passing to the bottom level to leave the flywheel 3 through lower aperture 61. A particulate return tray 60 is provided beneath the lower aperture 61 to direct the particulate back to reservoir 11. The lower aperture 61 may be provided with a closable hatch or valve to allow it to be opened and closed.

Figure 7:
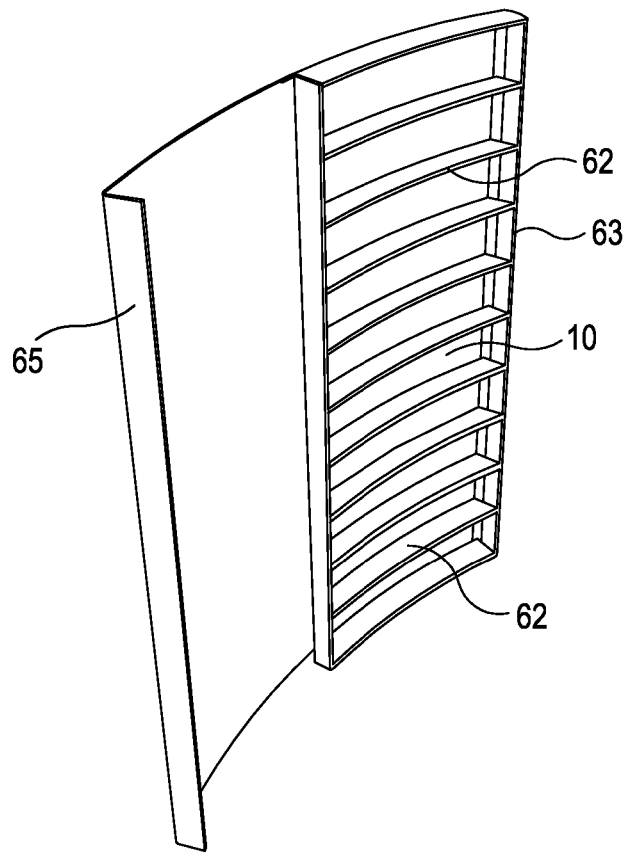
FIG. 7 shows an outer wall of a flywheel in accordance with the present invention.

FIG. 7 shows pre-fabricated flywheel sections 65 that incorporate a support means 62 which create cavities within the wall of the flywheel to support a quantity of particulates 10. The sides 63 of the section 65 are be bonded to the sides 63 of adjacent sections 65 to form the outer wall 5 of the flywheel 3.

Figure 8:
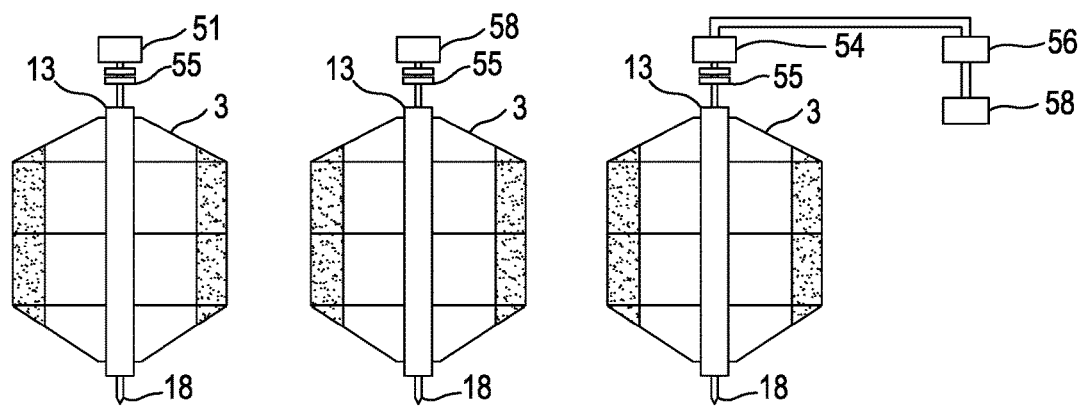
FIG. 8 shows an arrangement in which a motor, generator or turbine may be connected to a flywheel arrangement in accordance with the present invention.

As shown in FIG. 8, a motor 51 may be attached to a flywheel 3 by way of a clutch, the motor being used to convert electrical energy into rotational energy, which may be used to turn the flywheel 3. When the clutch 55, is engaged, the electrical energy supplied to the motor 51, may be used to drive and turn the flywheel 3. The computer control means may be used control the motor speed and direction and coordinate the addition of particulates into the cavity 17 of the flywheel 3.

FIG. 8 also shows how motor 58 may be situated remotely from the flywheel 3. The motor 58 may be used to drive a turbine 56 and pressure created within the turbine 56 may be used to transfer energy by the pressure of fluids, where one turbine 56 is used to transfer fluids in order to drive another turbine 54 and where the turbine 54 may be used to drive the flywheel 3.

A generator 58 may be attached to the flywheel 3 by way of the clutch 55. When the clutch 55 is engaged the kinetic energy stored within the rotating flywheel 3 may be transferred through the central shaft 13 and through the clutch 55 to the drive shaft of the electrical generator 58. The generator is used to convert the kinetic energy stored within the flywheel into electrical energy and the kinetic energy may be transferred through rotational energy from the flywheel to the generator.

A turbine 54 may be attached to the flywheel 3 by way of a clutch 55. When the clutch 55, is engaged, the kinetic energy stored within the rotating flywheel 3 may be transferred through the central drive shaft 13 and through the clutch 55 to the drive shaft of the turbine 54, which may in turn be connected to another turbine 56, situated remotely from the flywheel 3. The turbine may be directly connected to an electrical generator 57, which may also be situated remotely from the flywheel 3 to provided that may be used to transfer energy in to or out of the flywheel of the present invention. A clutch mechanism may be provided to connect or discount the central drive shaft of the flywheel to the drive shaft of a motor, generator or turbine.

When energy is available to be stored in the flywheel of the present invention then the clutch 55, is operated by signals from the computer control means and the clutch then engages the centre shaft of the flywheel with the drive shaft of the motor 51. When electrical energy is provided to the motor 51, the motor then turns and the engagement of the motor drive shaft with the flywheel drive shaft the speed of the flywheel is increased. The computer control means 24, receives signals from sensors that are positioned to measure the rotational speed of the flywheel and the forces therein. When the flywheel is rotating at a predetermined speed the computer control means 24, then provides signals to activate valves 41, to thereby allow the transfer of particulates from the reservoir to the injection nozzles 32.

Figure 9:
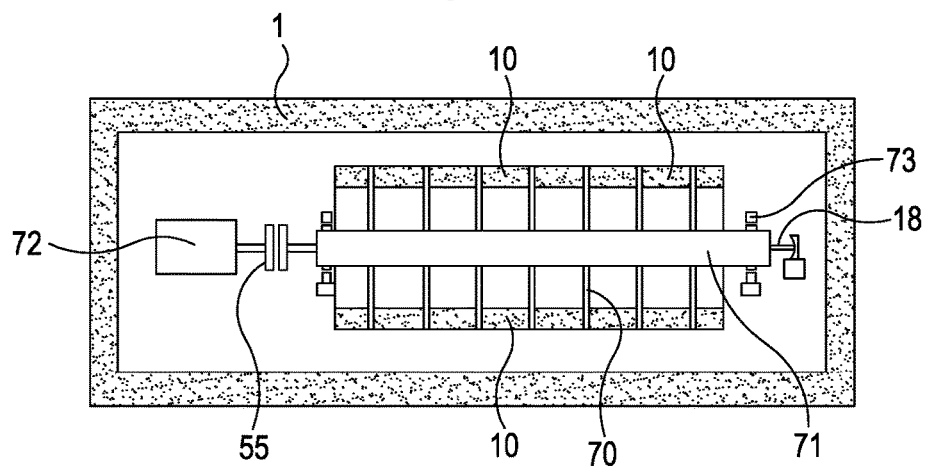
FIG. 9 shows a diagrammatic view of a horizontal axis flywheel arrangement according to the present invention.
Figure 10:
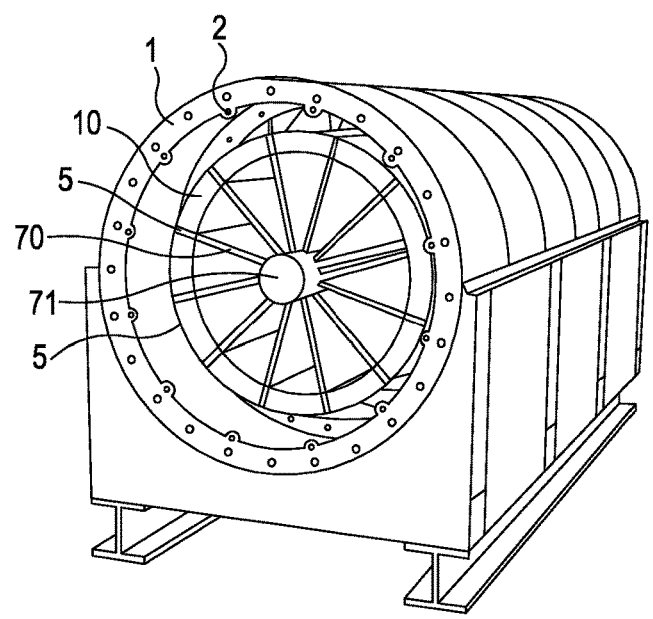
FIG. 10 shows a perspective view of the flywheel arrangement of FIG. 9.

FIGS. 9 and 10 show a horizontal axis flywheel arrangement wherein the flywheel comprises radially extending baffles, or supports, 70 that connect the central shaft 71 to the outer wall of the flywheel 5. A pin 18 is positioned within a recess and magnetic bearings 73 are employed to reduce friction on the flywheel when it rotates. A motor, generator or turbine 72 is provided and releasably connects to the flywheel by way of a clutch 55. The arrangement is contained within a destructive container 1.

Hatches may be provided which may be used to release particulates from within the flywheel. For example, the flywheel may be fitted with emergency escape hatches to release particulates from within the confines of the cavity of the flywheel 3. The emergency release hatches may be fitted with catches that allow the opening or removal the hatches 52, should the hatches come in to contact with the destructive nodes 2. This allows the rapid evacuation of the particulate in a radial direction.

Figure 11:
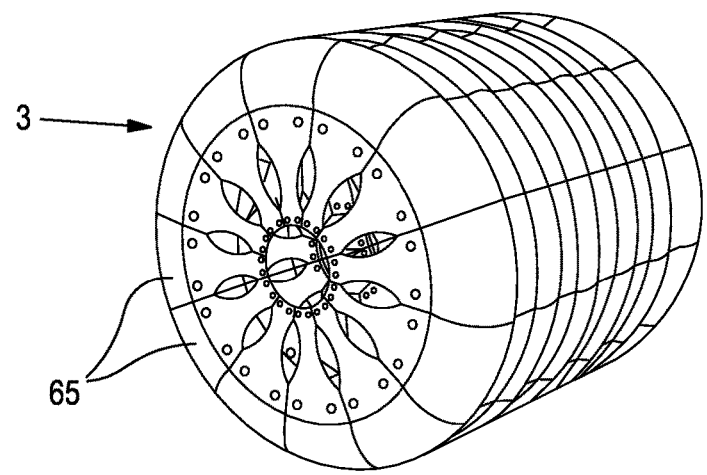
FIG. 11 shows a flywheel in accordance with the present invention.
Figure 12:
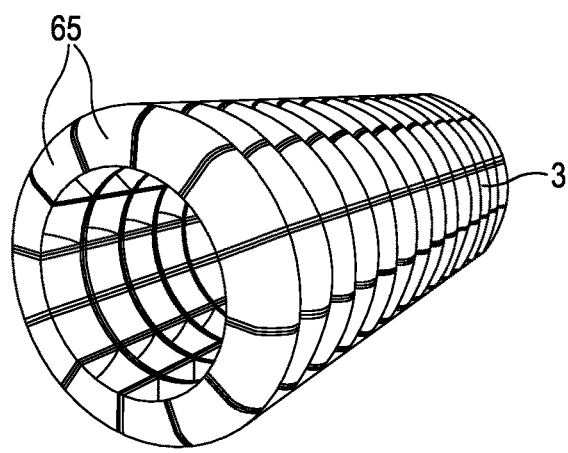
FIG. 12 shows a perspective view of the flywheel of FIG. 10 with the internal elements removed.
Figure 13:
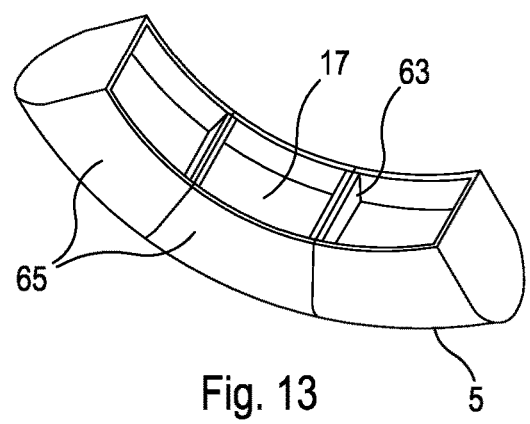
FIG. 13 shows a perspective view of a section of the flywheel of FIG. 12.

FIGS. 11 to 13 show a prefabricated flywheel 3 that is constructed for a plurality of sections 65 that are bonded to one another. The sections 65 are connected such that the side walls 63 are connected to the side walls 63 of adjacent sections 65. At least some, but preferably all, of the sections are provided with cavities 17 into which particulate can be placed.

Once the sections 65 are connected together, the flywheel 3 has a fixed mass, although the particulate 10 may be able to move within a cavity and may be allowed to pass through conduits or apertures (not shown) to pass into adjacent cavities 65. This arrangement allows for the flywheel 3 to be simplified without the need to an inlet through which particulate can pass into the flywheel 3. Should there be a desire to expand the flywheel 3, further sections 65 can be applied to the existing arrangement. The external surface of the sections 65 comprises the outer wall 5 of the flywheel 3.

Electrical energy may be derived from renewable energy generators such as for example photo electric solar panels, wind turbines, water turbines. Electrical energy may also be derived from other forms of electrical energy generation such as for example coal or gas turbines. Whichever form of electrical energy generation is used to supply electrical energy to the energy storage flywheel of the present invention the result is the same in as much as the electrical energy is used to drive a motor or a turbine which is then connected to the flywheel of the present invention through a clutch which may be used to engage or disengage the drive shaft of the motor with the central rotating drive shaft of the flywheel. Energy may be derived from any source and may be transferred from such sources without an electrical connection. Energy may be transferred using the pressure of fluids to drive turbines.

In an arrangement of the present invention a bearing may be situated at both ends of a flywheel when the central axis of rotation is situated in a horizontal or substantially horizontal axis.

One or more features of one embodiment described herein may be incorporated into any other embodiment herein. For example, the features described herein relating to vertical axis flywheels may be incorporated into a horizontal axis flywheel, such as the sensors provided in and on the flywheel and/or the computer control system. Similarly, the features of the horizontal axis flywheel may be incorporated into a vertical axis flywheel. For example, the particulate movement and/or flow may need to be adjusted according to the orientation of the flywheel.

Dummy sections without particulate-containing cavities may be employed to balance the flywheel. These dummy sections may be hollow or solid depending upon the requirements and they may fit adjacent particulate-filled flywheel sections.

The invention claimed is:

1. An energy storage flywheel arrangement comprising a shaft with a flywheel fixedly connected thereto, wherein the flywheel comprises at least two prefabricated cavity sections that are discrete with respect to each other, each of the at least two prefabricated cavity sections having an external connection surface, wherein the respective external connection surfaces of the at least two prefabricated cavity sections are connected together at an interface to at least partially form the flywheel as a segmented flywheel, wherein each of the at least two prefabricated cavity sections has a cavity therein, and wherein the cavity of at least one of the at least two prefabricated cavity sections is at least partially filled with particulate matter that is non-removable from the cavity section.

2. An energy storage flywheel arrangement according to claim 1, wherein at least one baffle extends substantially radially with respect to the shaft to at least partially partition the cavity of at least one of the prefabricated cavity sections.

3. An energy storage flywheel arrangement according to claim 1, wherein at least one baffle extends substantially parallel with the axis of the shaft.

4. An energy storage flywheel arrangement according to claim 1, wherein each of the at least two prefabricated cavity sections constructed from composite material.

5. An energy storage flywheel arrangement according to claim 1, wherein a fluid conduit is provided within the flywheel and the fluid conduit has an outlet that comprises at least one aperture to allow fluid from within the fluid conduit to pass into each cavity of the prefabricated cavity sections.

6. An energy storage flywheel arrangement according to claim 5, wherein the fluid conduit is a first fluid conduit, the flywheel arrangement comprising a second fluid conduit that is provided within, or adjacent, the shaft, and the second fluid conduit is in fluid communication with the outlet of the first fluid conduit.

7. An energy storage flywheel arrangement according to claim 1, wherein a sensor is provided within the cavity of the at least one prefabricated cavity section to monitor the particulate matter therein.

8. An energy storage flywheel arrangement according to claim 1, wherein the flywheel has flanges comprising at least one magnetic element and supports are provided for magnetically stabilising the flywheel.

9. An energy storage flywheel arrangement according to claim 1, wherein a vibration means is provided which is arranged to vibrate the flywheel.

10. An energy storage flywheel arrangement according to claim 9, wherein vibration means comprises a computer-controlled vibration mechanism and/or fluidising channels to aid with the even distribution of particulates within the flywheel.

11. An energy storage flywheel arrangement according to claim 1, wherein the flywheel arrangement is contained within a containment vessel and the containment vessel comprises one or more inwardly directed destructive nodes.

12. An energy storage flywheel arrangement according to claim 1, wherein the respective external connection surfaces of the of the at least two prefabricated cavity sections are connected together along the interface which lies in a radial plane of the energy storage flywheel arrangement.

13. An energy storage flywheel arrangement according to claim 1, wherein the respective external connection surfaces of the at least two prefabricated cavity sections extend to an outer diameter of the flywheel and are connected together such that the outer diameter of the flywheel is segmented.

14. An energy storage flywheel arrangement according to claim 1,
wherein each of the at least two prefabricated cavity sections includes at least one side wall, the at least one sidewall including the external connection surface and an internal surface, wherein the internal surface at least partially forms the cavity and the external connection surface is outside the cavity opposite the internal surface, and
wherein the respective external connection surfaces of the at least two prefabricated cavity sections are connected together with a connection mechanism.

15. An energy storage flywheel arrangement according to claim 1, wherein the at least two prefabricated cavity sections constitute part of an arrangement of prefabricated cavity sections that are connected together to fully encircle a rotational axis of the shaft.

16. A prefabricated energy storage flywheel section for use in an energy storage flywheel, the prefabricated energy storage flywheel section comprising a cavity that is at least partially filled with non-removable particulate; wherein the prefabricated energy storage flywheel section comprises at least one side wall, an external face, and an internal cavity, wherein the at least one side wall is provided with a part of a connection mechanism for connection to a second flywheel section of the energy storage flywheel.

17. A flywheel arrangement comprising a shaft with a flywheel fixedly connected thereto, wherein the flywheel comprises at least one cavity wherein the cavity is at least partially filled with particulate matter, wherein a sensor is provided within the cavity to monitor the particular matter therein.

18. A flywheel arrangement comprising a shaft with a flywheel fixedly connected thereto, wherein the flywheel comprises at least one cavity wherein the cavity is at least partially filled with particulate matter, wherein the flywheel has flanges comprising at least one magnetic element and support means are provided for magnetically stabilising the flywheel.

19. An energy storage flywheel arrangement comprising a shaft with a flywheel fixedly connected thereto, wherein the flywheel comprises at least one prefabricated cavity section, wherein the cavity section has a cavity therein, wherein the cavity of the cavity section(s) is at least partially filled with particulate matter that is nonremovable from the cavity section, and wherein a fluid conduit is provided within the flywheel and the fluid conduit has an outlet that comprises at least one aperture to allow fluid from within the fluid conduit to pass into the, or each, cavity.

20. An energy storage flywheel arrangement comprising a shaft with a flywheel fixedly connected thereto, wherein the flywheel comprises at least one prefabricated cavity section, wherein the cavity section has a cavity therein, wherein the cavity of the cavity section(s) is at least partially filled with particulate matter that is non-removable from the cavity section, and wherein a vibration means is provided which is arranged to vibrate the flywheel.

* * * * *